Sept. 8, 1942.                C. LE BLEU                2,295,263
                        SIGNAL DEVICE FOR VEHICLES
                        Filed Oct. 4, 1940            5 Sheets-Sheet 5
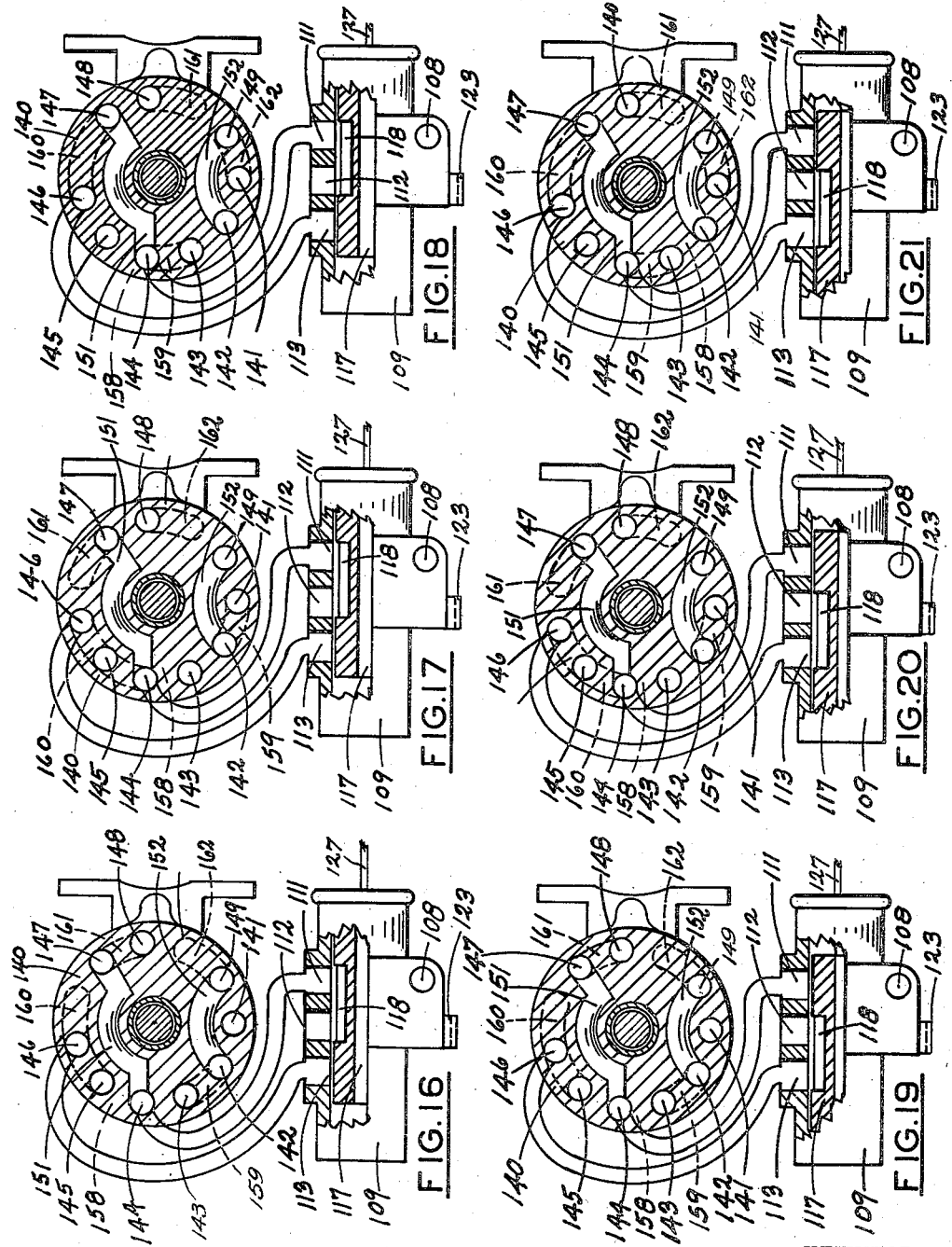
INVENTOR.
Charles Le Bleu Patented Sept. 8, 1942

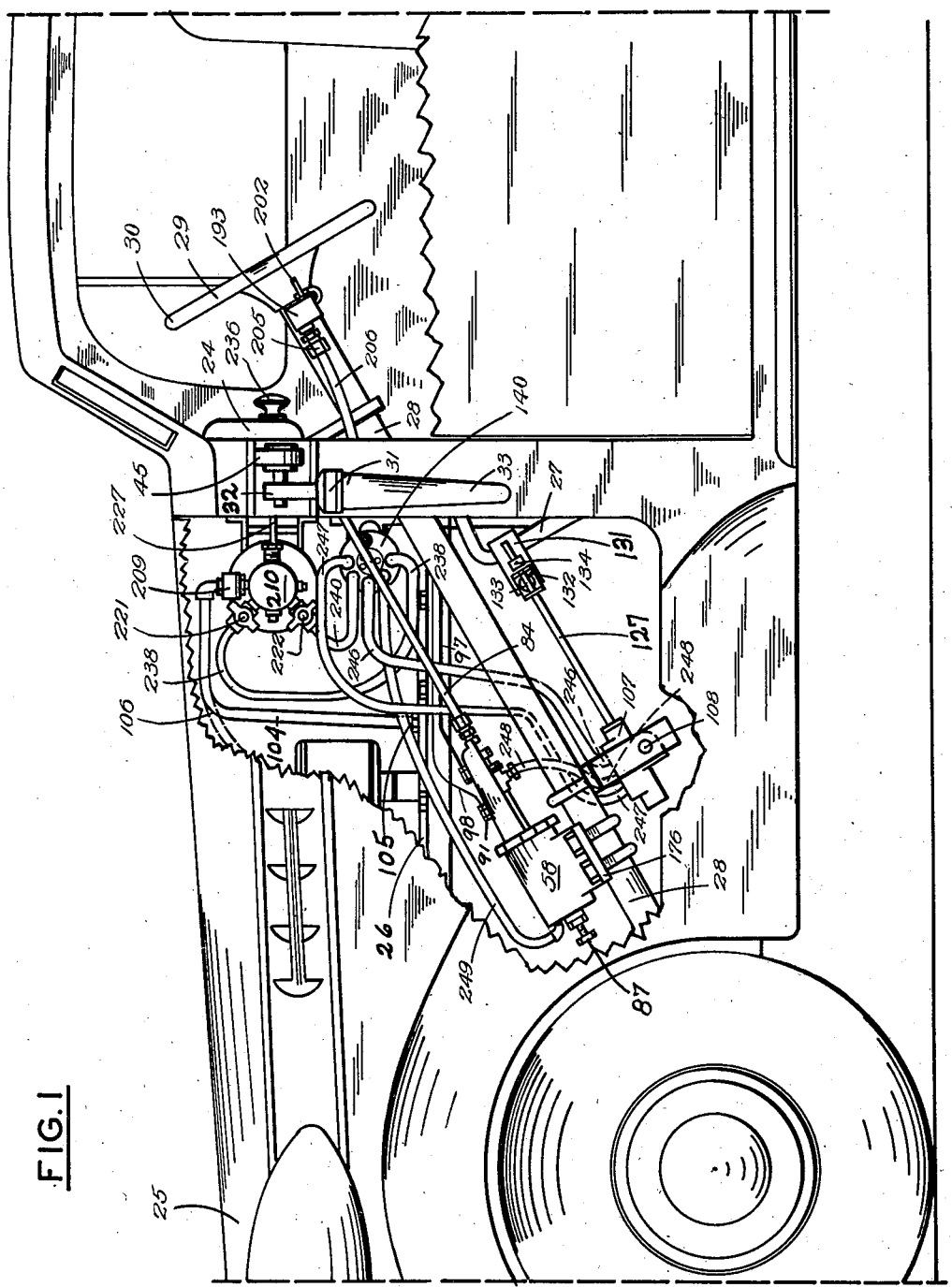

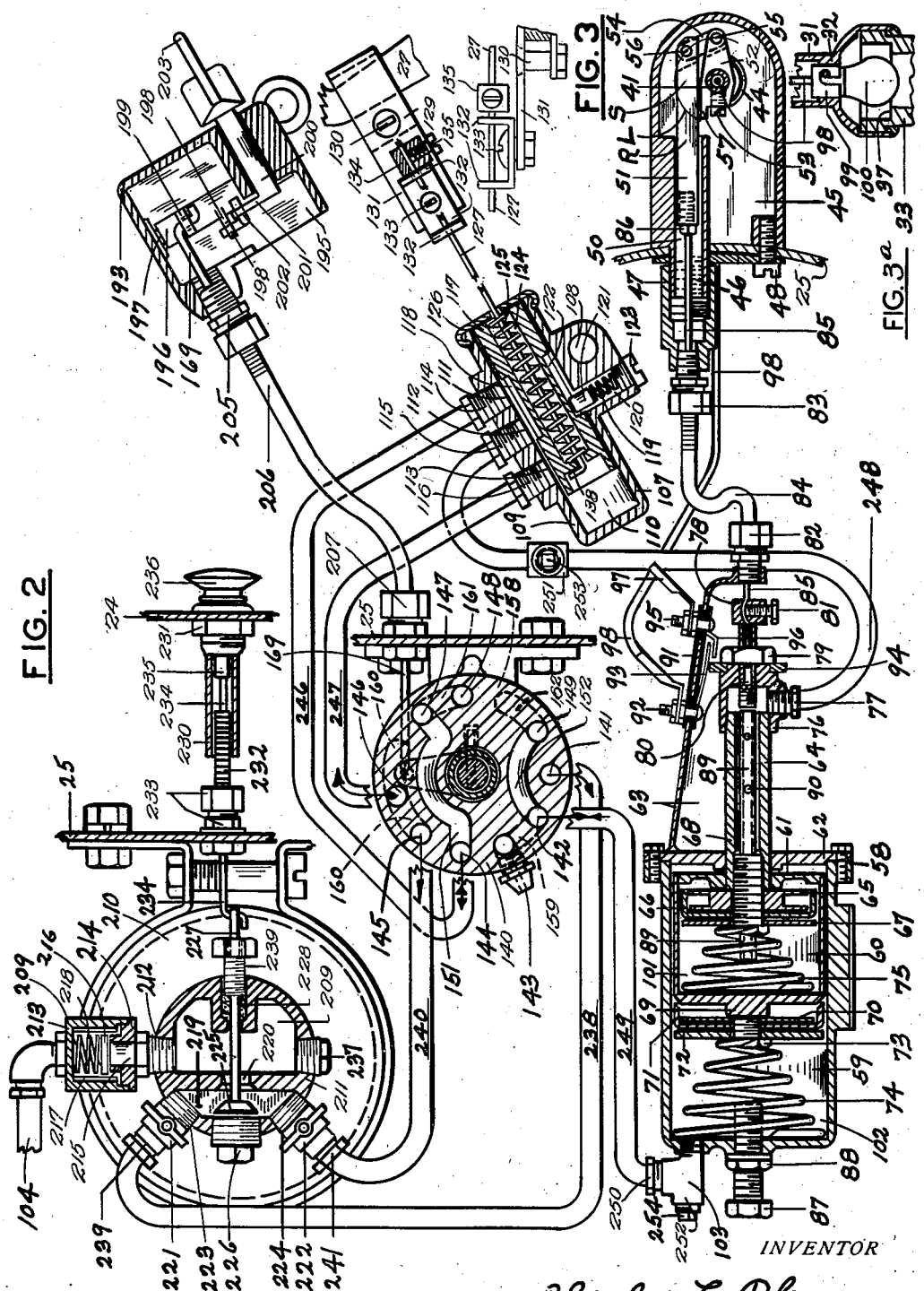

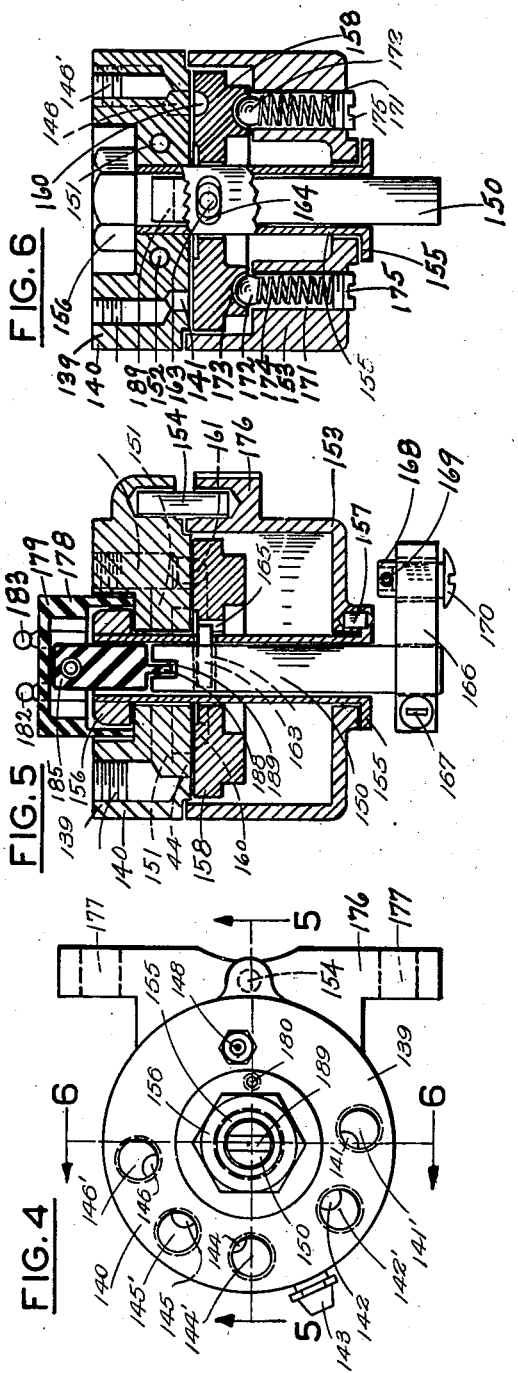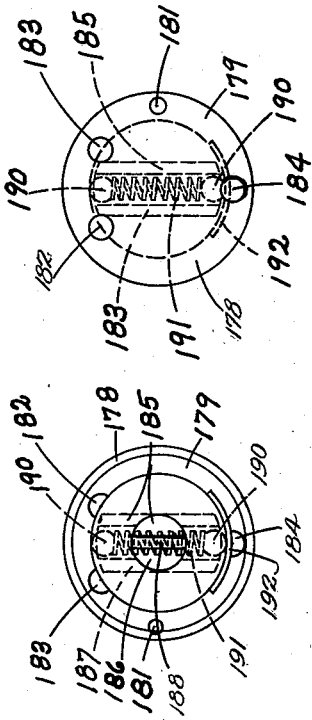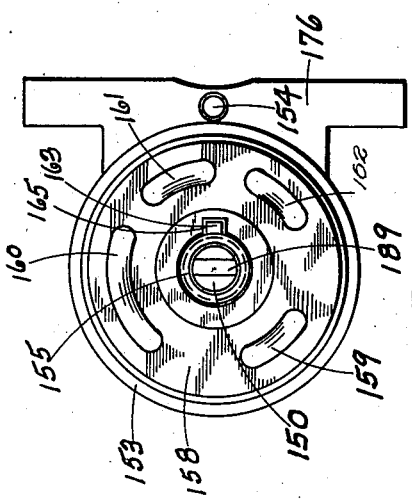

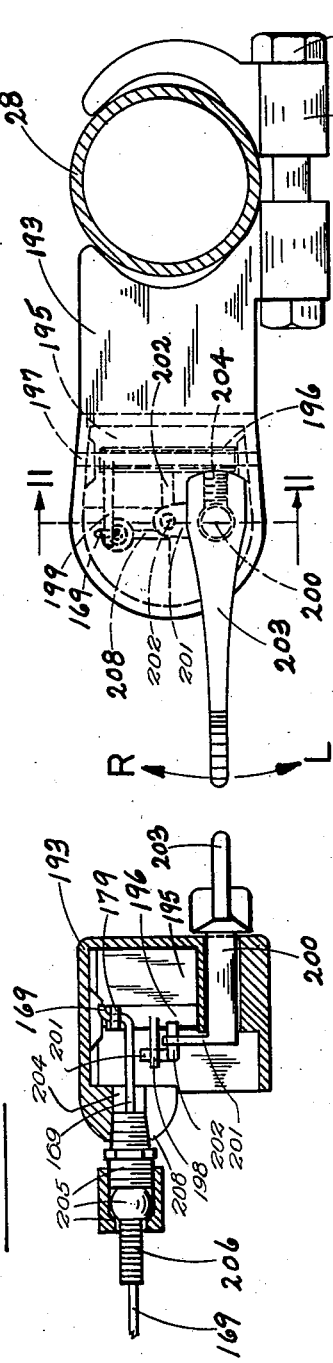

2,295,263

UNITED STATES PATENT OFFICE 2,295,263

SIGNAL DEVICE FOR VEHICLES

Charles Le Bleu, Los Angeles, Calif.

Application October 4, 1940, Serial No. 359,655

19 Claims. (Cl. 116—39)

This invention relates to a device adapted to be mounted upon a vehicle so as to be used by the operator thereof to indicate an intention to slow down, stop, or turn to the right or to the left.

The type of signal device to which this invention relates includes an arm supported upon the vehicle so that it may be selectively moved into positions indicating the intention of the operator.

It is well established as a custom or by law, that the operator of a vehicle must extend his own arm, or a mechanical arm, to the side of the vehicle before stopping the same or changing the direction of travel, the angle at which he extends the arm indicating whether it is his intention to slow down, stop, or execute a right or left turn. When a mechanical arm is used the free end of same normally extends downwardly, when in neutral position, so that the longitudinal extension thereof is substantially parallel to the vertical plane of the vehicle upon which it is mounted. The arm is then swung upwardly substantially forty five degrees to give the slow down or stop signal, ninety degrees to give the left turn signal, and one hundred and thirty five degrees to give the right turn signal, and throughout this application these various positions of the signal arm will be known in the order set forth as, "neutral position," "stop signal position," "left turn signal position," and "right turn signal position." It is well known that operators of motor vehicles are lax in giving the signals required by law or by custom. This is so because giving signals by extending the hand and arm is inconvenient. This is also true with respect to mechanical signal arms now in use.

Therefore, one of the objects of this invention is the provision of a signal device of the character described which includes more convenient and efficient control means.

Applicant has driven five trial trips in and around Los Angeles. All signals required by the laws of California were given. The total miles traveled was 124. The number of turn signals given was 107. The number of stop signals given was 333. The total number of signals given was 440. The rate of travel was 20 to 25 miles per hour. It will be noted that three fourths of the signals given were stop signals.

Therefore, another object of this invention is the provision; in a signal device adapted to be mounted upon a vehicle and having a signal arm adapted to be moved to stop position, said vehicle having brake mechanism and control means therefor, of means operably associating said signal device and said brake control means so as to cause said signal arm to move to stop position automatically when said brake control means are operated.

Still another object of this invention is the provision in a signal device of the character described, of a control means therefor including a hand actuator located with respect to the rim of the steering wheel so that same may be operated with one or more fingers of a hand resting on the rim of said steering wheel.

Still another object of this invention is the provision of a signal device including a signal arm adapted to be supported from a vehicle for movement into a signal position, of a plurality of operable devices applied to said arm, and operable to move the same into a signal position.

Still another object of this invention is the provision in a signal device including a signal arm adapted to be supported from a vehicle for movement into stop, right and left turn signal positions, of a plurality of operable devices applied to said arm and operable to move the same into signal position, and a plurality of controls for said operable devices, one of said controls being adapted to control the right and left turn positions of said arm, and another of said controls being adapted to control the stop position of said arm.

Still another object of this invention is the provision in a signal device including a signal arm adapted to be supported from a vehicle for movement into a signal position, of means for moving said signal arm comprising a plurality of pistons applied thereto, one of said pistons being operable to move said signal arm to stop position, and another of said pistons being operable to swing said signal arm to left turn position, and means for controlling the operation of said pistons.

Still another object of this invention is the provision in a signal device including a signal arm adapted to be supported from a vehicle for movement into signal position, of means for moving said arm comprising a plurality of pistons applied thereto, one of said pistons being operable to move said arm to stop signal position, the other of said pistons being operable to move said arm to left turn signal position, each of said pistons being operable in conjunction with the other of said pistons to move said arm to right turn signal position (stop position plus left turn position equals right turn position), and means for controlling the operation of said pistons.

Still other objects and advantages of this invention will be apparent to those skilled in the art upon a detailed perusal of the specifications in connection with the attached drawings wherein I exemplify and describe a preferred embodiment of my invention, but it is to be understood that my invention is susceptible to numerous changes and modifications in the combination, correlation, and construction of parts, members, and features, without departing from the spirit of the invention as defined in the annexed claims.

These objects are accomplished by the embodiment of my invention illustrated in the accompanying drawings in which:

Figure 1 is a fragmentary side view of a motor vehicle showing the invention mounted thereon, all parts of the invention being in the neutral position.

Figure 2 is an enlarged view in section, of the various parts of the invention shown in Figure 1.

Figure 3 is a bottom plan view of the connection to the brake pedal shank, shown in Figure 2.

Figure 3a is a fragmentary side view in section of the signal arm.

Figure 4 is an enlarged end view of the turn, or hand operated valve shown in Figures 1 and 2.

Figure 5 is a side view in section of the turn valve, taken on broken line 5—5 of Figure 4, parts being in the neutral or non-operative position.

Figure 6 is a side view in section of the turn valve, taken on broken line 6—6 of Figure 4, parts being in neutral position.

Figure 7 is an end view of the turn valve as in Figure 4, but with the valve head or end removed so as to show the grooved valve plug, which is the shaded portion, that cooperates with the parts shown in the valve head, or end, shown in Figure 4, parts being in neutral position.

Figure 8 is a bottom plan view of the electric switch shown installed on the upper end of Figure 5.

Figure 9 is a top plan view of Figure 8.

Figure 10 is an enlarged top plan view of the turn valve control lever support bracket mounted on the steering post in Figure 1, all parts being in neutral position. The letter R indicates the direction the lever is moved to secure a right turn signal and the letter L indicates the direction the control lever is moved to secure a left turn signal.

Figure 11 is a sectional view taken on line 11—11 of Figure 10, all parts being in neutral position.

Figure 12 is an enlarged sectional view of the signal arm support and operating structure taken through the axis about which the signal arm swings.

Figure 13 is an enlarged view of that side of the signal arm support bracket opposite the signal arm.

Figure 14 is an enlarged sectional view of the signal arm support bracket taken on broken line 14—14, Figure 12.

Figure 15 is an enlarged view of the illuminated portion of the signal arm.

Figure 16 is a diagrammatical illustration of the turn valve and stop valve, both in neutral position.

Figure 17 is a diagrammatical illustration of the turn valve in right turn position and the stop valve in neutral position.

Figure 18 is a diagrammatical illustration of the turn valve in left turn position, and the stop valve in neutral position.

Figure 19 is a diagrammatical illustration of the turn valve in neutral position and the stop valve in stop position.

Figure 20 is a diagrammatical illustration of the turn valve in right turn position and the stop valve in stop position.

Figure 21 is a diagrammatical illustration of the turn valve in left turn position and the stop valve in stop position.

Referring more particularly to the drawings, Figure 1 shows a motor vehicle 25, which is of a conventional type propelled by an internal combustion engine having the conventional intake manifold indicated at 26, and a conventional type of brake mechanism, including a brake pedal shank 27. A large proportion of the motor vehicles now in use are equipped with a vacuum booster pump and such is the case with the vehicle here shown. It is also equipped with a steering mechanism including a steering post 28 and a steering wheel 29 having a rim 30, and an instrument panel is shown at 24.

Referring now to Figures 1 to 15, a signal arm 31 comprises a socket section 32, and an illuminated section 33 which may be made of glass, or any suitable plastic material such as Tenite or Lucite. It is to be noted that the upper portion is formed with a large diameter portion 34 thus providing a shoulder at 35. The inside diameter is materially reduced at 36 thus providing a ledge 37, and the wall 38 becomes progressively thinner in a direction toward the lower end of the arm at 39. The purpose of the ledge 37 is to provide an end structure permitting the entrance of light into the wall 38, thus providing an arm having greater visibility at night.

The upper end 34 of the illuminated section 33 extends into the lower end of socket section 32 as shown and is secured in place by a threaded ring 40, the lower end of the socket section being also threaded.

The socket section 32 is hollow as shown and is provided with a horizontal opening into which a hollow shaft 41 extends, the signal arm 31 being rigidly secured to shaft 41 by means of the set screw 42.

Hollow shaft 41 is rotatably supported in ball bearings 43 and 44, said ball bearings being mounted as shown in the signal arm support bracket 45, said bracket 45 being mounted on the vehicle 25 as shown in Figure 1, the means by which bracket 45 is secured to said vehicle being better shown in Figures 2, 13, and 14, as follows: Bracket 45 is provided with a threaded extension 46 which projects through any structure selected as a suitable place to mount said bracket and a threaded female member 47 is applied to extension 46 and tightened. Screw 48 and hollow screw 49 also extend through said structure and assist in securing bracket 45 in place.

Bracket 45 and threaded extension 46 are provided with an opening 50 in which a rod 51 is slidably mounted, one end of said rod being disposed adjacent hollow shaft 41. Shaft 41 is provided with an arm 52 rigidly secured thereto by set screw 53, and a link 54 is pivotally connected at 55 with the arm 52 and at 56 with sliding rod 51.

It will be noted that arm 52 is also provided with an opposite extension 57 arranged to contact the under side of rod 51, when the same is in the neutral position shown in Figure 2, so as to limit the swinging movement of the signal arm toward the vehicle.

A signal arm operator for swinging signal arm 31 into the various signal positions is indicated generally at 58, Figures 1 and 2, and includes a turn cylinder 59, so named because it is evacuated only when giving a turn signal, said turn cylinder being provided with a base portion, better shown in Figure 1, for attaching same to the vehicle. Slidably confined within turn cylinder 59 is a stop cylinder 60, so called because it is evacuated when giving stop signals. A cylinder head 61 closes the forward end of stop cylinder 60, and a cylinder head 62 closes the forward end of turn cylinder 59, and is provided with an overhanging projection 63. A hollow piston rod 64 slidably projects through both cylinder heads 61 and 62, into stop cylinder 60, and is provided with a piston head comprising a backing block 65 disposed within the walls of a flexible cup 66, and a disk 67. A threaded bushing 68 is provided with a head, and passes through the central portions of disk 67, cup 66, and backing block 65, and is screwed into the adjacent end of piston rod 64 which is provided with a female thread, thus providing a stop piston slidably disposed within stop cylinder 60.

Stop cylinder 60 is provided at its closed end with a projection 69 including a threaded rod portion as shown. A piston head is mounted on said threaded rod portion and comprises, a backing disk 70 disposed within the walls of a flexible cup 71 and a washer 72 disposed against the outer face of said cup, the piston assembly being secured in place by a nut 73, thus providing a turn piston slidably disposed within turn cylinder 59.

A compression spring 74 is disposed within turn cylinder 59 between the closed end thereof and the turn piston head, and normally yieldably resists movement of said piston toward said spring.

A compression spring 75 is disposed within stop cylinder 60 between the closed end thereof and the stop piston head, and normally resists movement of the stop piston toward said spring and relative to cylinder 60.

Piston rod 64 is provided on its outer end with a head piece 76 having a threaded opening into which a conduit connection 77 is screwed, and is provided at its forward end with a second threaded opening into which a cap screw 78 is screwed and secured against accidental turning by a jam nut 79. It will be noted that cap screw 78 is provided with a hole 80 which extends for some distance longitudinally thereof, but not the entire length of the screw. Cap screw 78 is also provided with a threaded opening in the head thereof extending substantially at right angles to opening 80 and is provided with a set screw 81.

The overhanging ends of overhanging projection 63, and threaded female member 47 are each provided with a compression male connector, sleeve and nut assembly respectively as shown at 82 and 83, said connectors being of a conventional type used extensively in the automotive industry for connecting copper tubing. This type of a connector is used in a number of places in this invention and is shown in section in Figure 13. Connectors 82 and 83 are utilized as a means for connecting the ends of housing 84 to the overhanging ends of projection 63 and the threaded female member 47 as shown, said housing 84 being adapted to extend by devious ways between projection 63 and member 47.

Housing 84 may be of any suitable material such as the conventional copper tubing used extensively in the automotive industry, "flexible shaft housings," or what is commonly known as "plumbers' cable." The housing 84 is plumber's cable.

A flexible pull wire 85 extends into the opening 80 in cap screw 78 and is secured thereto as shown, by set screw 81, pull wire 85 extending thence through connector 82 and 83 and housing 84 to a connection, as shown at 86, with sliding rod 51. Thus, the turn and stop pistons are operably applied to the signal arm 31 so that movement of said pistons will cause said signal arm to swing.

Referring again at this time to the movement of the signal arm and the operating connections thereto, refer to Figure 2 in which S, L, and R, indicate substantially the points to which pivot 56 should be moved to swing the signal arm respectively into stop, left turn and right turn positions. It will be noted that the distances from the pivot 56 to point S, is substantially the same as the distance from point L to point R, and the arrangement of pivots 55 and 56 with respect to the axis of shaft 41 so as to produce this result is predicated on the fact that while there are three signal positions to which the signal arm may be swung, there are only two operating pistons with which to produce three positions of the signal arm. But, pivots 55 and 56 being arranged as described, it is clear that the stop piston may be operated to swing the signal arm to stop position, and that the turn piston may be operated to swing the signal arm to left turn position, and that if both pistons are operated at the same time the signal arm will be swung to right turn position because the distance from pivot 56 to point S, plus the distance from pivot 56 to point L is equal to the distance from pivot 56 to point R. Obviously then, the travel of the stop piston should be equal to the distance from 56 to S. And the travel of the turn piston should be equal to the distance from pivot 56 to point L.

Therefore, means are provided for adjusting the travel of each piston. The closed end of the turn cylinder 59 is provided with a threaded opening into which a cap screw 87 is screwed and against the end of which the turn piston may come to rest. The cap screw 87 may be screwed in or out as the conditions require, and secured against accidental turning by jam nut 88. Thus, I have provided means for selectively determining the stroke, or travel, of the turn piston. A tubular member 89 is disposed within the hollow piston rod 64 and extends through male threaded bushing 68 some distance past the head thereof so as to come to rest against the closed end of cylinder 60 when the stop piston has traveled the distance required to swing the signal arm to stop position, the opposite end of tubular member 89 then resting against the end of cap screw 78. The stroke or travel of the stop piston may be adjusted by loosening set screw 81 and turning cap screw 78 either to the right or left as conditions require. Set screw 81 is then tightened to reconnect pull wire 85 to the pistons.

The tubular member 89 is materially smaller in diameter than the inside diameter of piston rod 64, but is a sliding fit in the male threaded bushing 68. It is to be noted that tubular member 89 is provided with openings 90 which serve to connect the air space around the outside of tubular member 89 with the opening therethrough, said opening being in communication with the stop cylinder. Thus, stop cylinder 60 is in communication with the conduit connection 77.

Thus, it is seen that I have provided a plurality of pistons operably applied to a movable signal arm, said pistons being operable to move said signal arm into a signal position.

An electric switch 91 is mounted upon the overhanging projection 63 and is insulated therefrom as shown, and includes a terminal 92. A bar of spring bronze or brass 93 is secured adjacent an end thereof to the lower end of terminal 92 and is shown as resting intermediate its ends upon an insulated operator 94 carried by head piece 76. A second terminal is shown at 95. A bar of metal is shown at 96 and is secured adjacent an end thereof to terminal 95, the free end portion of bar 96 being offset and arranged so that the free end extends toward and some distance below the free end of bar 93 as shown. A fragment of an electric wire 97 is shown as being connected to terminal 95, the opposite end of said wire 97 to be connected with a battery, not shown because it is of conventional design, and is such as will be found on all motor vehicles with which applicant is familiar. An electric wire 98 is connected with terminal 92 as shown and extends to a light bulb socket 99 mounted, as shown, in the lower end of signal arm socket 32 and is detachably secured in place by a set screw 139', said socket 99 being provided with a light bulb 100, both the socket 99 and bulb 100 being of a conventional design used extensively in the automotive industry.

It will be noted, see Figures 12, 13 and 14, that bracket 45 is provided with a conduit 136 provided with a hollow screw 49. Conduit 136 terminates in an enlarged portion 137 through which ball bearings 43 and 44, and shaft 41 are installed, the enlarged portion 137 being provided with a detachable cover 138.

In extending wire 98 from terminal 92 to light bulb 100, it is passed through hollow screw 49, conduit 136 and hollow shaft 41 and thence downwardly to socket 99 as shown.

All parts being in the neutral position shown in Figure 2, it should be clear that the light bulb 100 is not burning, there being an air gap between the adjacent ends of bars 93 and 96 due to the fact that bar 93 is held in a raised position by the insulation operator 94. However, upon movement of one or both of the pistons in a direction which will result in swinging signal arm 31 toward a signal position, insulation operator 94 will be withdrawn from supporting association with bar 93 so that the adjacent ends of bars 93 and 96 will contact causing the bulb 100 to light when the signal arm has been swung to a position somewhere between the neutral and stop position of said signal arm.

Thus, I have provided means for illuminating said signal arm when the same is disposed in a signal position.

It will readily be understood that the stop piston and turn piston may be caused to move toward the closed end of their respective cylinders by evacuating air from the stop and turn compartments indicated respectively at 101 and 102, and thus cause the signal arm 31 to swing. Conduit connections 77 and 103, in communication respectively with compartments 101 and 102, are provided for connecting said compartments with a source of evacuation. This evacuating means may consist of an internal combustion engine used as a source of power for propelling the vehicle, or it may consist of a vacuum pump of conventional design mounted on the vehicle. When compartments 101 and 102 are connected with the engine vacuum, it will be convenient to make this connection to the intake manifold 26 thereof, conduit 104 being connected to the intake manifold at 105 as shown in Figure 1. If compartments 101 and 102 are to be connected to a vacuum pump, then conduit 104 would extend thereto as indicated by broken lines 106, Figure 1. Conduit 106 is shown as extending in a direction toward the front of the vehicle because the conventional type of vacuum pump is usually located in the forward portion of the engine compartment.

Now the necessity for interposing control means in the conduits connecting the evacuating means with compartments 101 and 102 so that it will be possible to control the evacuation of said compartments and, consequently, the position of signal arm 31, is readily apparent.

These control means comprise a stop valve 107, so called because it is used to control the operation of the stop piston, and a turn valve 139, so called because it is used to control the operation of the turn piston.

Stop valve 107 is provided with an opening 108 to be used to mount the valve on the vehicle. Stop valve 107 is mounted relative to the brake control means 27 as shown in Figure 1. Valve 107 comprises a body 109, having a bore 110 and is provided with openings, or ports, 111, 112 and 113 through the wall of the body 107. The port holes are threaded to receive conduit connections 114, 115 and 116. A stop valve plug 117 is slidably disposed within bore 110, as shown, and is provided with an elongated groove 118 of sufficient length to serve as a conduit connecting ports 111 and 112, in the neutral position of said plug 117 shown in Figure 2, and to connect parts 112 and 113 in stop position of said plug. The grooved conduit side of valve plug 117 is urged into sealing contact with the port side of the valve body bore 110 by means of a compression spring 119, as shown, the body 107 having an opening 120 on its under side provided with a rod 121 slidably mounted therein, said rod projecting into a groove 122 formed in the under side of valve plug 117, spring 119 being in compression between the lower end of rod 121 and a retainer screw 123.

Stop valve plug 117 is provided with a bore 124 having an abrupt reduction at its lower end as shown, so as to provide a seat for a compression spring 125 disposed within bore 124, said spring being in compression between said seat and a valve body head 126.

A control wire 127, extends through an opening in head 126 as shown, and thence through the bore 124, the end thereof being bent as shown at 128.

Brake pedal shank 27 is provided with a U clamp bracket 129, which is clamped in place by a bolt 130 as shown in Figures 1, 2, and 3, said bracket being provided with an extension 131 having a U shaped wire connector 132 pivotally supported thereon as shown at 133. Control wire 127 passes through an opening through each of the legs of the connector 132, as shown, and through block 134, said block being secured to wire 127 by means of set screw 135. Thus, the stop valve 107 is operably associated with the brake control mechanism to be automatically operated thereby. When the brake control mechanism 27 is in the neutral position shown, the stop valve plug will be held thereby, against the pressure of spring 125, in a position connecting ports 111 and 112 as shown. When the brake pedal is depressed, control wire 127 is slackened and spring 125 acts upon valve plug 117 to move the same into position connecting ports 112 and 113. When the brake pedal is released, valve plug 117 will be returned to neutral position against the pressure of spring 125.

Due to the fact that ports 111, 112, and 113 are only a short distance apart, it is only necessary to depress the brake pedal a short distance to provide the slack in wire 127 necessary to allow valve plug 117 to move into position connecting ports 112 and 113, so as to cause the stop signal to show. There is more than enough looseness in the brake control mechanism to provide the slack required in wire 127, so that the brakes need not actually be applied to cause the signal arm to swing to stop position. This is very important because by custom, and by the laws of most states, the stop signal must be given for at least the last fifty feet of travel before bringing the vehicle to a stop. I provide means for accomplishing this result, for to give a stop signal it is only necessary to rest the foot lightly on the brake pedal to take up all or a part of the looseness in the brake control mechanism thus causing the stop signal to show, and when the vehicle arrives at the place where it is to be stopped, the brakes are then applied.

Turn valve 139, comprises a valve head 140 provided with ports 141, 142, 143, 144, 145, 146, 147, 148, and 149, arranged in a circle about the axis of a valve stem 150 as shown. Ports 144 and 147 are interconnected by a conduit 151, and ports 141, 142, 144, 145, and 146 each connect respectively with threaded openings 141', 142', 144', 145', and 146', see Figure 4. A valve body 153 and valve head 140 are assembled as shown in a fixed relation as determined by dowel pin 154, and are secured in rigid assembly by threaded bushing 155 and nut 156, bushing 155 also having a fixed relation to valve body 153 as determined by dowel pin 157, see Figure 5. A turn valve plug 158, see especially Figure 7, is provided with elongated grooves 159, 160, 161, and 162, arranged in a circle coinciding with the circular arrangement of ports 141 to 149 about the axis of valve stem 150 and is provided with an opening through which bushing 155 passes.

Valve stem 150 is mounted for turning movement in bushing 155 and is provided with a pin 163 which projects through a slot 164, see Figure 6, in the wall of bushing 155, and extends beyond said bushing into a slot 165 provided in valve plug 158.

It will be noted that slot 164 is elongated in a direction extending circumferentially of bushing 155. In the neutral position shown pin 163 is disposed centrally of slot 164, said slot extending to each side of pin 163 a distance equal to the movement of valve plug 158 in a given direction. Thus, it is readily seen that valve stem 150 may be turned in either direction a distance determined by the elongation of slot 164 for the purpose of registering grooves 159 to 162 with adjacent ports 141 to 149.

A crank 166 is adjustably secured to valve stem 150 by means of a screw 167, see Figure 5, so that said crank may be secured to said valve stem in any selected radial position. The reason for this arrangement resides in the fact that, in practice, it will be necessary to mount the valve in a number of different positions as determined by the structure of the vehicle upon which it is to be mounted.

A female threaded bushing 168 is journaled in the free end of crank 166, and is provided with an opening adjacent an end thereof through which a control wire 169 passes, and a screw is screwed into said bushing tightly against control wire 169 so as to form a rigid assembly of said control wire with said bushing. Thus by means of said bushing and screw, said control wire is pivotally connected with said crank.

In Figure 6, a pair of devices are shown, the purpose of which is to releasably retain valve plug 158 in the neutral position shown, and to at all times maintain said valve plug in sealing contact with the confronting face of valve head 140. Since they are identical, only one will be described as follows: valve body 153 is provided with an opening 171 in which a ball 172 is slidably disposed, said ball being disposed so as to rest in a ball seat 173 formed in valve plug 158, in neutral position of said plug, and a compression spring 174 is interposed between said ball and a retainer screw 175. The ball is forced out of the ball seats against the pressure of spring 174 when the valve plug is rotated to operating position, and re-enters the ball seat under pressure from spring 174 when the valve plug is returned to neutral position.

Attention is directed to the fact that the valve body 153 is provided with a base 176 having openings 177 for use in securing the valve to the vehicle.

A large number of the motor vehicles now in use are equipped with two lights on the rear end thereof, and an electric switch, the lever for operating the same being located on the steering column beneath the steering wheel. When it is desired to signal for a right turn the control lever is operated to cause the right rear light to burn. When it is desired to signal for a left turn a similar procedure is followed and the left rear light will burn. In some localities these light signals are rejected as a substitute for hand signals. When applicant's device is to be mounted on a vehicle so equipped it will be desirable to remove the control switch and operating lever for said lights because it would be impractical for the operator to operate two signal devices with two separate controls. Therefore, I have provided an electric switch 178, see Figures 5, 8 and 9, adapted to be mounted on the turn valve, as shown, and operated in common therewith. The switch comprises a stationary body 179 mounted about the nut 156 in the depression formed in the turn valve head 140 and may be secured in place by a screw. The threaded hole adapted to receive said screw is shown in Figure 4 at 180, the screw opening through the switch body being shown at 181, Figures 8 and 9.

Switch body 179 is provided with terminals 182, 183 and 184, arranged as shown.

A rotor 185 is disposed within said body and is formed with a stem portion 186 and a cross head portion 187. Stem portion 186 is adapted as shown at 188 to fit closely into a slot 189 provided in the upper end of valve stem 150 so that said rotor will be operated in common with valve plug 158. Cross head 187 is provided as shown with an opening having a pair of balls 190 disposed one in each of the ends thereof, said balls being forced outwardly in contact with the walls of body 179 by the action of a compression spring 191 disposed in compression between said balls as shown. It will be noted that terminal 184 is provided with a base portion 192 which extends circumferentially of the wall of body 179 in both directions from said terminal, as shown, so that one of the balls 190 will be in contact with terminal 184 in neutral, right, and left turn positions of the rotor 185. Terminal 184 is to be used in connecting the switch to the battery, and the arrangement of terminals 184 and 183 is such as to provide a connection between terminal 184 and 182 in right turn position of valve plug 158, and a connection between terminal 184 and 183 in left turn position of valve plug 158, terminal 182 to be connected with the right turn light, and terminal 183 to be connected with the left turn light. Thus, I have provided an auxiliary electric switch to be operated in common with the turn valve so that a conventional type of right and left turn light signal device may be used in conjunction with applicant's invention.

A turn valve control includes a two piece clamp bracket 193, clamped on the steering column 28 by means of a bolt 194 as shown. The free end of bracket 193 is in the form of a box like structure as shown at 195. A crank sleeve 196 is rockably supported on a shaft 197 extending transversely of box like structure 195 and is provided with cranks 198 and 199 as shown. A crank stem 200 is journaled, as shown, in box like structure 194 and is provided with a crank 201 on its lower end, and a connecting link 202 is pivotally connected at one end with the free end of crank 201 and at its opposite end with the free end of crank 198. The upper projecting end of crank stem 200 is provided with an operating hand lever 203 rigid therewith by means of a set screw 204.

Bracket 193 is mounted with relation to the rim 30 of steering wheel 29 so that hand lever 202 can be reached with the fingers of a hand resting in position on the steering wheel rim, and thus the hand lever 203 can be conveniently operated without removing the hand from the rim of the steering wheel.

Bracket 193 is provided with a threaded opening 204 arranged relative to the free end of crank 199 and is provided with a compression male connector, sleeve and nut assembly, of a conventional type, at 205 and by which a wire housing 206 is connected, as shown, to bracket 193, the opposite end of said housing being arranged relative to the free end of crank 166 carried by valve stem 150, and attached to adjacent structure of the vehicle as shown at 207. This connection is made with a compression male connector, sleeve, and nut assembly of the type shown at 83 and 205.

A control wire 169 is connected with the free end of crank 166 as hereinbefore described, and is shown in Figure 5, and control wire 169 passes thence through the housing 206 to a pivotal connection, as shown, with the free end of crank 199. Bracket 193 is provided with a slot 208 to facilitate the installation of wire 169.

It is now clear that if control lever 203 is swung in the direction R, see Figure 10, control wire 169 will be caused to move toward the turn valve, and by reason of its connection to the free end of valve stem crank 166, valve plug 158 will be moved into right turn position, and if hand lever 203 is swung in the direction L, see Figure 10, control wire 169 will be caused to move in a direction away from the turn valve, and valve plug 158 will be moved into left turn position.

Now it is well known that the degree of evacuation in the intake manifold of an internal combustion engine used to propel a motor vehicle is not of a constant value because of the air intake opening through the carburetor. There is relatively low vacuum in the manifold when the engine is running with a large air intake opening through the carburetor.

It has been determined that if applicant's turn valve is connected directly to the intake manifold and the turn valve is then operated during high vacuum in said manifold to swing the signal arm into a turn position and, subsequently, the air intake through the carburetor is materially increased then manifold vacuum will be less than cylinder vacuum and air will flow from the manifold to the cylinders until manifold and cylinder vacuum is equalized, and in some conditions the equalized vacuum is insufficient to support the signal arm in a true signal position.

Therefore, applicant has interposed a check valve 209, to be described later, in the conduit connections between the turn valve and the intake manifold so as to prevent the flow of air from the manifold to the cylinders during low vacuum in the manifold.

Furthermore, it has been determined that under some conditions, such as when the vehicle is being driven up a very steep hill with a large air intake through the carburetor, then manifold vacuum may be insufficient to swing the signal arm to a turn position. Therefore I have interposed a reserve vacuum tank 210 in the conduits connecting the check valve and the turn valve.

A vacuum reserve tank is shown at 210 and may be secured to vehicle 25 as shown in Figure 2. The tank is provided with an extension 211 having a threaded opening to which a check valve 209 is applied as shown at 212. The check valve is open at both ends and a conduit 104 is connected to the upper end of check valve 209 as shown, and extends to a connection with the intake manifold as shown at 105, Figure 1. Check valve 209 comprises a body 213, and a base 214, said base being provided with an opening 215 connecting with tank 209, and a plug 216 for closing said opening. Body 213 is provided with a plurality of vertically extending channels such as is shown at 217, and compression spring 218 is interposed between the upper end of body 213 and plug 216. Air may be evacuated from the tank to the intake manifold through opening 215 and conduit 104 during high vacuum in the manifold and the check valve closes during low vacuum in said manifold thus maintaining a reserve of high vacuum in the tank during low vacuum in the manifold, said high tank vacuum being available for swinging the signal arm.

It will be seen that a partition separates tank 209 proper from a compartment shown at 219, said partition being provided with a connecting port 220.

Compartment 219 is provided with a pair of threaded openings to which a pair of shut off cocks 221 and 222 are applied as shown at 223 and 224 respectively. The purpose of these shut cocks is to selectively fix the rate of evacuation of cylinder compartments 101 and 102 so as to fix the rate of travel of the signal arm from neutral to a signal position.

There may be times when the vehicle will be operated in places where clearance at the side of the vehicle is impaired, such as, in garages and parking lots. It is desirable to render the signal device inoperative under these conditions because the stop signal is given automatically as hereinbefore described, and since the signal arm projects to the side of and beyond the vehicle when in stop position, the signal arm could be damaged by contact with some adjacent vehicle or other structure.

I have therefore provided means operable from the driver's compartment of the vehicle for rendering the signal device inoperative, comprising a plug 225, which is installed through the opening shown as closed by pipe plug 226, said plug being provided with a rod 227 which extends through connecting port 220, a stuffing box 228 as shown, and packing nut 239.

A threaded escutcheon 230 is mounted through the instrument panel 24 as shown, and is held rigid therewith by jam nut 231. A wire housing 232 extends into the adjacent end of threaded escutcheon 230 as shown, the opposite end being arranged relative to rod 227 and secured to adjacent structure by means of a conventional type of compression male connector, sleeve and nut assembly as shown at 233, and a control wire 234 is connected as shown to the projecting end of rod 227 and extends thence through wire housing 232 to a connection with rod 235 slidably mounted, as shown, in the threaded escutcheon and is provided on its projecting end with a knob 236. The plug 225 is shown in the open, or operating position. When it is desired to render the signal device inoperative, the knob 236 is grasped and pulled outwardly until plug 225 seats tightly in connecting port 220.

Pipe plug 237 is shown as closing an auxiliary opening into tank 210. It is suggested that a conduit connected at one end with the cylinder of a conventional type of vacuum operated windshield wiper may have its opposite end connected with this opening.

The conduit connection between the vacuum reserve tanks, 210, and the intake manifold, or vacuum pump as the case may be, has been described, and the conduit connections between the vacuum tank 210 and the turn valve, the connections between the turn valve and the stop valve, and the connection of both valves with the power device will now be described.

Conduit 238 is connected at 239 with cock 221 and to turn valve port 141.

Conduit 240 is connected to cock 222 at 241 and to turn valve port 145.

Conduit 246 connects turn valve port 144 with the stop valve port at 111.

Conduit 247 connects turn valve port 146 with stop valve port 113.

Conduit 248 connects stop valve port 112 with the stop cylinder compartment 101 as shown at 77.

Conduit 249 connects turn valve port 142 with the turn cylinder compartment 102 as shown at 250.

Perhaps it is best stated at this time that turn valve ports 143 and 148 are each provided with a reduced air inlet, as best shown in Figure 4 at 143 and 148. The purpose of these reduced or controlled openings is to retard the inflow of air into the evacuated cylinder compartments 101 and 102 as the stop and turn pistons move from a signal position to the neutral position shown, so as to cause the signal arm to return to neutral position quietly. Hereafter the ports will be referred to as atmosphere ports 143 and 148.

Turn valve ports 147 and 149 do not, as shown, extend through the upper surface of turn valve head 140 but, instead, connect respectively by internal conduits 151 and 152 with turn valve ports 144 and 142 as shown.

In describing the invention in operation we shall begin with all parts in the neutral position shown in Figures 1 to 16, and have further references to Figures 1 to 21 inclusive, and when reference is made to clockwise or counterclockwise movement we shall mean the reference to apply to the parts mentioned from the direction we view them in the drawings.

At least 50 feet before a right turn is to be executed the turn valve control lever 203 is operated in a clockwise direction to its limit of movement, resulting in disposing turn valve plug 158 in the position, relative to ports 141 to 149, shown in Figure 17, in which vacuum tank 210 is connected with turn cylinder compartment 102 by registering groove 159 with ports 141 and 142, the vacuum pull thus applied causing the turn piston to move to its limit of travel to swing the signal arm 31 substantially 90 degrees, but it will also be seen that the stop cylinder compartment 101 has also been connected with the vacuum tank 210 by registering groove 160 with ports 144, 145 and 146, port 144 being connected with cylinder compartment 101 through the stop valve, conduit 246 connecting port 144 with port 111 on the stop valve, port 111 being connected to port 112 by groove 118 and port 112 being connected to compartment 101 by conduit 248, so that the stop piston will also have been caused to move to its limit of travel to swing the signal arm substantially 45 degrees, the combined action of both pistons resulting in swinging the signal arm substantially 135 degrees from neutral position so that it extends outwardly and upwardly from the axis about which it moves.

When the right turn has been completed control lever 203 is operated in a counterclockwise direction to restore valve plug 158 to the neutral position shown in Figure 16 in which turn cylinder compartment 102 is connected with atmosphere by registering groove 159 with port 142 and atmosphere port 143, and stop cylinder compartment 101 is connected with atmosphere by registering groove 161 with atmosphere port 148 and port 147, port 147 being interconnected by conduit 151 with port 144 which is connected with cylinder compartment 101 as above described.

Figure 17, the description of which we have just concluded, shows the turn valve in right turn position and the stop valve in neutral position.

Figure 20 also shows the turn valve in right turn position, but the stop valve is in stop position.

Now it is often necessary to give a right turn signal when the brakes of the vehicle are being partially applied. The stop valve would therefore be in the stop position shown in Figure 20, in which ports 112 and 113 are connected by groove 118, port 113 being connected by conduit 247 with turn valve port 146 connected by groove 160 with port 145, which in turn is connected with vacuum tank 210 by conduit 240, port 112 being also connected to stop cylinder compartment 101, and the stop piston will therefore have been caused to move to its limit of travel to swing the signal arm substantially 45 degrees to stop position, so that when the turn valve is operated to the right turn position shown in Figure 20, the turn piston will be caused to operate to its limit of travel to swing signal arm 31 from stop to right turn position. Now, if the brakes are released while the signal arm is in right turn position, then stop valve plug 118 will be caused to move to its neutral position. But this will in no way affect the position of signal arm 31 since the stop cylinder compartment 101 will then be connected with tank 210 as shown in Figure 17 heretofore described. That is, by shifting stop valve plug 117 from the position shown in Figure 20 to neutral we will have produced the showing of Figure 17.

At least 50 feet before a left turn is to be executed the control lever 203 should be swung in a counterclockwise direction to its limit of movement, resulting in disposing the turn valve plug, 158, in the position, relative to turn valve ports 141 to 149, shown in Figure 18, in which ports 141 and 149 are connected by groove 162, port 149 being connected by conduit 152 with turn valve port 142, in turn connected by conduit 249 with turn cylinder compartment 102, port 141 being connected with tank 210 as hereinbefore described. The vacuum pull thus applied causes the turn piston to move to its limit of travel to swing the signal arm 31 substantially 90 degrees to left turn position, that is to a substantially horizontal position with respect to the vertical plane of the vehicle. Now it will be noted that in the left turn position of turn valve plug 158 shown in Figure 18, ports 144 and 146, which are connected respectively by conduits 246 and 247 to stop valve ports 111 and 112, are both connected to atmosphere port 143, ports 146 and 147 being connected by groove 160, and ports 147 and 144 being connected by conduit 151, ports 144 and 143 being connected by groove 159, port 145 connected with tank 210 being closed as shown. Clearly then, the stop valve is not connected with any source of evacuation, but on the contrary, ports 111 and 113 are connected to atmosphere port 143 so that the position of stop valve plug 117 in its stop or neutral position can have no effect on the position of signal arm 31 when the turn valve is in left turn position.

When the left turn has been completed, control lever 203 is swung in a clockwise direction to neutral position of valve plug 158, shown in Figure 16, in which both cylinder compartments are each connected with an atmosphere port as hereinbefore described.

At least 50 feet before the vehicle is brought to a stop, the foot should be lightly applied to the brake pedal. This will result in shifting stop valve plug 117 from its neutral position shown in Figure 16 to the stop position shown in Figure 19, in which stop valve ports 112 and 113 are connected by groove 118, port 112 being connected with the stop cylinder compartment 101 as described, and port 113 being connected by conduit 247 with port 146, connected by groove 160 with port 145 which is connected with the tank 210 as described, thus causing the stop piston to move to its limit of travel to swing the signal arm 31 substantially 45 degrees to stop position.

Now it is often necessary to give a left turn signal when the stop valve plug 117 and the signal arm 31 are in stop position. Therefore, the turn valve control lever is operated in a counterclockwise direction and the turn piston is caused to move to its limit of travel as before described, to swing signal arm 31 into the left turn position, and at the same time, see Figure 21, port 145, which is connected to tank 210, has been closed and port 146 is connected with atmosphere port 143, as hereinbefore described, and the stop piston will move from stop to neutral position.

Thus, when the turn valve is operated to give a left turn signal when the signal arm is in stop position, the stop cylinder is connected with an atmospheric port and the stop piston moves to neutral position while the turn cylinder is being evacuated to move the turn piston in a direction to swing the signal arm to a left turn position.

Now it will be readily understood that, while I have shown my invention mounted on a self propelled vehicle, a bracket 45 and signal arm 31 together with a vacuum power device, and the operating connections by which it is applied to said signal arm for swinging the same, may be mounted upon a trailing vehicle attached to said self-propelled vehicle so as to be drawn thereby, and conduits may extend from the branch connections at 251 and 252, now shown as closed by pipe plugs 253 and 254, to the stop and turn cylinder compartments 101 and 102 respectively mounted on the trailer, so that the signal device on the trailer may be controlled in common with the signal device mounted on the self-propelled vehicle by the operator thereof.

I have shown the preferred form of my invention as now known to me, and have exemplified the application thereof to the vehicle 25, but it will be understood that motor vehicles now in use differ considerably in the arrangement of the parts, members and features thereof and therefore, my invention is susceptible to numerous changes, by those skilled in the art, in the arrangement of the various parts of my invention upon the vehicle and in the means I have shown for attaching the same thereto, without departing from the spirit of the invention as claimed.

What I claim is:

1. In a device of the character described adapted to be mounted on a vehicle having brake mechanism and brake control means therefor, a signal arm operably mounted on said vehicle so as to be selectively disposed in neutral and in stop signal positions, and signal arm operating and control means for said signal arm arranged relative to said brake control means and including operative connection therewith so as to be actuated thereby to cause said signal arm to move from neutral position to stop signal position when said brake control means are operated in a direction applying said brakes, said signal arm operating means being operable when said brake controls are actuated to release said brakes to return said signal arm from stop signal position to neutral position, and means adapted to function automatically in conjunction with said signal arm operating means to retard and control the return movement of said signal arm to neutral position so as to cause said signal arm to come to rest at said neutral position quietly.

2. In a device of the character described adapted to be mounted on a vehicle having brake mechanism and brake control means therefor, a signal arm operably mounted on said vehicle so as to be selectively disposed in neutral and stop signal positions, a signal arm operator applied to said arm and operable to move the same from neutral to stop signal position, and control means for said signal arm operator including operative connection with said brake control means so as to be actuated thereby to cause said signal arm operator to operate and move said arm to stop signal position when said brake control means are actuated in a direction applying said brakes, resilient means acting in conjunction with said signal arm operator to move said signal arm from stop signal position to neutral position when said brake controls are actuated in a direction releasing said brakes, and means adapted to function automatically in conjunction with said signal arm operator and said resilient means to retard and control the return movement of said arm to neutral position so as to cause said signal arm to come to rest in said neutral position quietly.

3. In a device of the character described adapted to be mounted on a vehicle having brake mechanism and actuating means therefor, a signal arm operably mounted on said vehicle so as to be selectively disposed in neutral and stop signal positions, signal arm operating means including a stop cylinder provided with a stop piston, said piston being applied to said signal arm and operable to move the same from neutral to stop signal position, and means for operating said piston and including control means therefor arranged relative to said brake actuating means and operably associated therewith so as to be automatically operated thereby to cause said piston to operate and move said signal arm to stop signal position when said brake actuating means are actuated in a direction applying said brakes, resilient means between said cylinder and said piston acting in a direction moving said piston and said signal arm from stop signal position to neutral position when said brake controls are operated releasing said brakes, and means functioning automatically to retard and control the return movement of said piston and said signal arm toward neutral position so as to cause said signal arm to come to rest at said neutral position quietly.

4. In a device of the character described adapted to be mounted on a vehicle provided with a driver's compartment and having brake mechanism and brake control means therefor, a signal arm operably mounted on said vehicle so as to be selectively disposed in neutral position or in stop signal position, or in right or left turn signal position, two signal arm operators applied in common to said arm and operable to move the same to a signal position, a stop signal control for one of said operators arranged relative to said brake control means and having operative connection therewith so as to be actuated thereby to cause said one of said operators to operate and move said signal arm from neutral to stop signal position when said brake control means are actuated, and a turn signal control for said operators arranged relative to said driver compartment and including an actuator operable in one direction to cause one of said operators to operate so as to move said signal arm to left turn signal position, and said actuator being operable in yet another direction to cause both of said signal arm operators to operate so as to move said signal arm to right turn signal position.

5. In a device of the character described adapted to be mounted on a vehicle, a signal arm operably mounted on said vehicle so as to be selectively disposed in neutral position and in a stop signal position and in a right or left turn signal position, signal arm operating means including a stop cylinder and a turn cylinder provided respectively with a stop piston and a turn piston, both of said pistons being applied to said signal arm and operable to move the same into signal position, means fixing the limits of travel of said pistons said stop piston being operable to move said arm to stop signal position, said turn piston being operable to move said arm to left turn position, and each of said pistons being operable in conjunction with the other of said pistons to move said signal arm to right turn signal position, and means for causing said pistons to operate.

6. In a device of the character described adapted to be mounted on a vehicle having brake mechanism and control means therefor, a signal arm operably mounted on said vehicle so as to be disposed in neutral position and in stop signal position and in a right or a left turn signal position, signal arm operating means including a stop cylinder and a turn cylinder provided respectively with a stop piston and a turn piston, both of said pistons being applied to said signal arm and operable to move the same from neutral position to signal position, said stop piston being operable to move said arm to stop signal position, said turn piston being operable to move said arm to a left turn signal position, each of said pistons being operable in conjunction with the other of said pistons to move said signal arm to right turn signal position, means for actuating said pistons and control means for said piston actuating means including a stop piston control and a turn piston control, said stop piston control including operative connection with said brake control means so as to be actuated thereby when said brake control means are actuated to cause said stop piston to operate, and said turn piston control including an actuator operable in one direction to cause said turn piston to operate and operable in yet another direction to cause both pistons to operate.

7. In a device of the character described adapted to be mounted on a vehicle, a signal arm operably mounted on said vehicle so as to be selectively disposed in neutral position and in stop signal position, and in right or left turn signal position, signal arm operating means including a stop cylinder and a turn cylinder provided respectively with a stop piston and a turn piston, both of said pistons being applied to said signal arm and operable to move the same into signal position, said stop piston being operable to its limit of travel to move said arm to stop signal position, said turn piston being operable to its limit of travel to move said arm to left turn signal position, each of said pistons being operable in conjunction with the other of said pistons to move said signal arm to right turn signal position.

8. In a device of the character described adapted to be mounted on a vehicle, a signal arm operably mounted on said vehicle so as to be selectively disposed in neutral position and in stop signal position and in right or left turn signal position, signal arm operating means including a stop cylinder and a turn cylinder provided respectively with a stop piston and a turn piston, both of said pistons being applied to said signal arm and operable to move the same into signal position, said stop piston being operable to its limit of travel to move said arm to stop signal position, said turn piston being operable to its limit of travel to move said arm to left turn signal position, each of said pistons being operable in conjunction with the other of said pistons to move said signal arm to right turn position, and means to fix said limits of travel of said pistons.

9. In a device of the character described adapted to be mounted on a vehicle, a signal arm operably mounted on said vehicle so as to be selectively disposed in a neutral position, or in a stop signal position, or in right or left turn signal positions, signal arm operating means including a stop cylinder and a turn cylinder provided respectively with a stop piston and a turn piston, both of said pistons being applied to said signal arm and operable to move the same into signal position, means to evacuate said cylinders to cause said pistons to operate, a turn valve having a neutral position and right and left turn positions, a stop valve, a conduit connecting said turn cylinder with said turn valve, a conduit connecting said stop cylinder with said stop valve, conduits connecting said stop valve with said turn valve and conduits connecting said turn valve with said evacuating means, said turn valve being adapted to connect said turn cylinder and said stop valve with atmosphere and said stop valve with said evacuating means in neutral position of said turn valve, said stop valve being adapted to selectively connect said stop cylinder with atmosphere or with said evacuating means in neutral position of said turn valve.

10. In a device of the character described adapted to be mounted on a vehicle having brake mechanism and control means therefor, a signal arm operably mounted on said vehicle so as to be selectively disposed in a neutral position or in a stop signal position or in a right or a left turn signal position, signal arm operating means including a stop cylinder and a turn cylinder provided respectively with a stop piston and a turn piston, both of said pistons being applied to said signal arm and operable to move the same into signal position, means to evacuate said cylinders to cause said pistons to operate, a turn valve having a neutral position and right and left turn positions, a stop valve, a conduit connecting said turn cylinder with said turn valve, a conduit connecting said stop cylinder with said stop valve, conduits connecting said stop valve with said turn valve and conduits connecting said turn valve with said evacuating means, said turn valve being adapted to connect said turn cylinder and said stop valve with atmosphere and said stop valve with said evacuating means in neutral position of said turn valve, said stop valve being adapted to selectively connect said stop cylinder with atmosphere or with said evacuating means in neutral position of said turn valve, and control means for said stop valve, said stop valve control means including operative connection with said brake control means so as to be automatically actuated thereby when said brake controls are operated.

11. In a device of the character described adapted to be mounted on a vehicle, a signal arm operably mounted on said vehicle so as to be selectively disposed in a neutral position and in a stop signal position and in a right or a left turn signal position, signal arm operating means including a stop cylinder and a turn cylinder provided respectively with a stop piston and a turn piston, both of said pistons being applied to said signal arm and operable to move the same to signal position, means for evacuating said cylinders to cause said pistons to operate, a stop valve, a turn valve having a neutral position and right and left turn positions, a conduit connecting said turn cylinder with said turn valve, a conduit connecting said stop cylinder with said stop valve, conduits connecting said stop valve with said turn valve and conduits connecting said turn valve with said evacuating means, said turn valve being adapted to connect said stop valve and said stop cylinder with atmosphere and said turn cylinder with said evacuating means in left turn position of said turn valve, and control means for said valves.

12. In a device of the character described adapted to be mounted on a vehicle, a signal arm operably mounted on said vehicle so as to be selectively disposed in a neutral position and in a stop signal position and in a right or a left turn signal position, signal arm operating means including a stop cylinder and a turn cylinder provided respectively with a stop piston and a turn piston, both of said pistons being applied to said signal arm and operable to move the same to signal position, means for evacuating said cylinders to cause said pistons to operate, a stop valve having a neutral position and a stop position, a turn valve having a neutral position and right and left turn positions, a conduit connecting said turn cylinder with said turn valve, a conduit connecting said stop cylinder with said stop valve, conduits connecting said stop valve with said turn valve and conduits connecting said turn valve with said evacuating means, said turn valve being adapted to connect said evacuating means with said turn cylinder and said stop valve in right turn position of said turn valve, said stop valve being adapted to effect a connection between said stop cylinder and said evacuating means in both the neutral and stop positions of said stop valve during said right turn position of said turn valve, and control means for said valves.

13. In a device of the character described adapted to be mounted on a vehicle, a signal arm operably mounted on said vehicle so as to be selectively disposed in a neutral position and in a stop signal position and in a right and a left signal position, a vacuum actuated power device applied to said signal arm and operable to move the same to signal position, evacuating means for causing said device to operate control valve means between said evacuating means and said power device comprising a turn valve having neutral, right and left turn positions, a stop valve having a neutral position and a stop position, a conduit connecting said turn valve with said power device, a conduit connecting said stop valve with said lower device, conduits connecting said turn valve with said evacuating means, and interconnecting conduit means between said turn valve and said stop valve through which said turn valve is adapted to provide connection of said stop valve with said evacuating means in neutral position of said turn valve, said turn valve being also adapted to disconnect said stop valve from said evacuating means in left turn position of said turn valve, and a check valve between said turn valve means and said evacuating means.

14. In a device of the character described adapted to be mounted on a vehicle, a signal arm operably mounted on said vehicle so as to be selectively disposed in a neutral position and in a stop signal position and in a right and a left turn signal position, signal arm operating means including a stop cylinder and a turn cylinder provided respectively with a stop piston and a turn piston, both of said pistons being applied to said signal arm and operable to move the same into signal position, evacuating means applied to said cylinders for evacuating the same, control valve means between said evacuating means and said cylinders comprising a turn valve having a neutral position and right and left turn positions and a stop valve having a neutral position and a stop position, a conduit connecting said turn valve with said turn cylinder, a conduit connecting said stop valve with said stop cylinder, conduit means connecting said turn valve with said evacuating means, and interconnecting conduit means between said turn valve and said stop valve through which said turn valve is adapted to provide connection of said stop valve with said evacuating means in neutral position of said turn valve, and a check valve between said evacuating means and said turn valve means.

15. In a device of the character described adapted to be mounted on a vehicle, a signal arm operably mounted on said vehicle so as to be selectively disposed in an neutral position and in a stop signal position and in a right or left turn signal position, a vacuum actuated power device applied to said signal arm and operable to move the same to signal position, evacuating means applied to said device for evacuating the same, control valve means between said evacuating means and said power device, comprising a turn valve having a neutral position and right and left turn positions and a stop valve having neutral and stop positions, conduits connecting both said valves with said power device, conduit means connecting said turn valve with said evacuating means, and interconnecting conduit means between said turn valve and said stop valve through which said turn valve is adapted to provide connection of said stop valve with said evacuating means in neutral position of said turn valve, said stop valve being adapted to selectively connect or disconnect said evacuating means and said power device in neutral position of said turn valve, a reserve vacuum tank between said turn valve means and said evacuating means, and a check valve between said reserve vacuum tank and said evacuating means.

16. In a device of the character described adapted to be mounted on a vehicle, a signal arm operably mounted on said vehicle so as to be selectively disposed in a neutral position and in a stop signal position and in a right or a left turn position, signal arm operating means including a stop cylinder and a turn cylinder provided respectively with a stop piston and a turn piston, both of said pistons being applied to said signal arm and operable to move the same into signal position, evacuating means applied to said cylinders for evacuating the same, control valve means between said evacuating means and said cylinders comprising a turn valve having a neutral position and right and left turn positions and a stop valve having neutral and stop positions, a conduit connecting said turn cylinder with said turn valve, a conduit connecting said stop cylinder with said stop valve, conduits connecting said turn valve with said evacuating means, and other conduits interconnecting said turn valve with said stop valve and through which said turn valve is adapted to selectively connect or disconnect said evacuating means and said stop valve depending upon the position of said turn valve, a reserve vacuum tank between said evacuating means and said turn valve means, and a check valve between said reserve vacuum tank and said evacuating means.

17. In a signal device of the character described adapted to be mounted on a vehicle, a signal arm operably mounted on said vehicle so as to be selectively disposed in a neutral position and in a stop signal position and in a right and a left turn signal position, a vacuum operated power device applied to said signal arm and operable to move the same to signal position, means for evacuating said power device to cause the same to operate, control valve means between said power device and said evacuating means for controlling the operation of said power device comprising a turn valve having a neutral position and right and left turn positions and a stop valve having neutral and stop positions, conduits connecting both said valves with said power device, conduit means connecting said turn valve with said evacuating means, and conduit means interconnecting said turn valve and said stop valve and through which said turn valve is adapted to selectively connect or disconnect said evacuating means and said stop valve depending upon the position of said turn valve.

18. In a device of the character described adapted to be mounted on a vehicle having brake mechanism and brake control means therefor said brake controls being operable through an initial stage to take up the slack in said brake mechanism and said controls and thereafter operable to apply said brakes, a signal arm operably mounted on said vehicle so as to be selectively disposed in a neutral position or in a stop signal position, or in a right or a left turn signal position, a vacuum operated power device applied to said signal arm and selectively operable to move the same to signal position, means for evacuating said power device to cause the same to operate, control valve means between said power device and said evacuating means for controlling the operation of same comprising a turn valve having neutral and right and left turn positions and a stop valve having neutral and stop positions, conduit means connecting both said valves with said power device, conduit means connecting said turn valve with said evacuating means, conduit means interconnecting said turn valve and said stop valve and through which said turn valve is adapted to selectively connect or disconnect said evacuating means and said stop valve depending upon the position of said turn valve, said stop valve being adapted to selectively connect or disconnect said evacuating means and said power device in neutral position of said turn valve, and means operably associating said stop valve with said brake control means to be actuated thereby as said brake control means operate through said initial stage so as to connect said evacuating means with said power device in neutral position of said turn valve for causing said power device to operate and move said signal arm to stop signal position substantially before said brakes are applied.

19. In a device of the character described adapted to be mounted on a vehicle, a signal arm support bracket, a rotatable shaft carried by said bracket, a signal arm rig with said shaft, an arm rigid with said shaft and having free ends terminating outwardly therefrom at opposite sides of said shaft, a rod extending across said shaft above the same and overhanging said arm, said rod being slidably supported on said bracket, a link pivotally connected at one end to said rod and at its other end to a free end of said arm, and means for sliding said rod to impart swinging movement to said signal arm, the other free end of said arm being arranged to engage said rod at times so as to limit swinging movement of said signal arm in one direction.

CHARLES LE BLEU.